United States Patent
Ma et al.

(10) Patent No.: US 9,674,086 B2
(45) Date of Patent: Jun. 6, 2017

(54) WORK CONSERVING SCHEDULAR BASED ON RANKING

(71) Applicant: Cisco Technology, Inc., San Jose, CA (US)

(72) Inventors: Sha Ma, San Jose, CA (US); Philip Chen, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 185 days.

(21) Appl. No.: 14/462,453

(22) Filed: Aug. 18, 2014

(65) Prior Publication Data

US 2015/0124832 A1    May 7, 2015

Related U.S. Application Data

(60) Provisional application No. 61/900,377, filed on Nov. 5, 2013.

(51) Int. Cl.
*H04L 12/865* (2013.01)
*H04L 12/863* (2013.01)
(Continued)

(52) U.S. Cl.
CPC ............ *H04L 45/74* (2013.01); *G06F 5/16* (2013.01); *G06F 9/4881* (2013.01);
(Continued)

(58) Field of Classification Search
CPC ..... H04L 45/74; H04L 47/62; H04L 47/6275; H04L 47/623; H04L 47/562; G06F 5/16; G06F 2205/064; G06F 9/4881
See application file for complete search history.

(56) References Cited

U.S. PATENT DOCUMENTS 5,859,835 A * 1/1999 Varma ................. H04L 49/3081
370/229
5,926,458 A * 7/1999 Yin ..................... H04L 12/5693
370/230
(Continued)

OTHER PUBLICATIONS

Anonymous: "Subset—Wikipedia, the free encyclopedia," Dec. 25, 2014, pp. 1-3, XP055161881, Retrieved from the Internet: URL:http://en.wikipedia.org/wiki/Subset [retrieved on Jan. 14, 2015].
(Continued)

*Primary Examiner* — Chi H Pham
*Assistant Examiner* — Shailendra Kumar
(74) *Attorney, Agent, or Firm* — Polsinelli LLP

(57) ABSTRACT

A work conserving scheduler can be implemented based on a ranking system to provide the scalability of time stamps while avoiding the fast search associated with a traditional time stamp implementation. Each queue can be assigned a time stamp that is initially set to zero. The time stamp for a queue can be incremented each time a data packet from the queue is processed. To provide varying weights to the different queues, the time stamp for the queues can be incremented at varying rates. The data packets can be processed from the queues based on the tier rank order of the queues as determined from the time stamp associated with each queue. To increase the speed at which the ranking is determined, the ranking can be calculate from a subset of the bits defining the time stamp rather than the entire bit set.

20 Claims, 7 Drawing Sheets

(51) Int. Cl.
*H04L 12/741* (2013.01)
*G06F 5/16* (2006.01)
*G06F 9/48* (2006.01)
*H04L 12/875* (2013.01)
*H04L 12/54* (2013.01)

(52) U.S. Cl.
CPC ........ *H04L 12/5693* (2013.01); *H04L 47/562* (2013.01); *H04L 47/62* (2013.01); *H04L 47/623* (2013.01); *H04L 47/6275* (2013.01); *G06F 2205/064* (2013.01)

(56) References Cited

U.S. PATENT DOCUMENTS

| | | | |
|---|---|---|---|
| 6,389,031 B1 * | 5/2002 | Chao | H04L 12/5693 370/412 |
| 6,714,553 B1 | 3/2004 | Poole et al. | |
| 6,757,897 B1 * | 6/2004 | Shi | G06F 9/4843 710/240 |
| 6,876,952 B1 * | 4/2005 | Kappler | H04L 1/0018 370/218 |
| 7,372,857 B1 * | 5/2008 | Kappler | H04L 12/5693 370/395.4 |
| 7,426,604 B1 | 9/2008 | Rygh et al. | |
| 2006/0031643 A1 | 2/2006 | Figueira et al. | |
| 2012/0163396 A1 | 6/2012 | Cheng et al. | |
| 2012/0275304 A1 * | 11/2012 | Patel | H04L 45/302 370/230.1 |
| 2012/0300787 A1 * | 11/2012 | Korger | H04L 47/125 370/412 |

OTHER PUBLICATIONS

International Search Report and Written Opinion for PCT/US2014/063581 mailed Jan. 21, 2015.

* cited by examiner

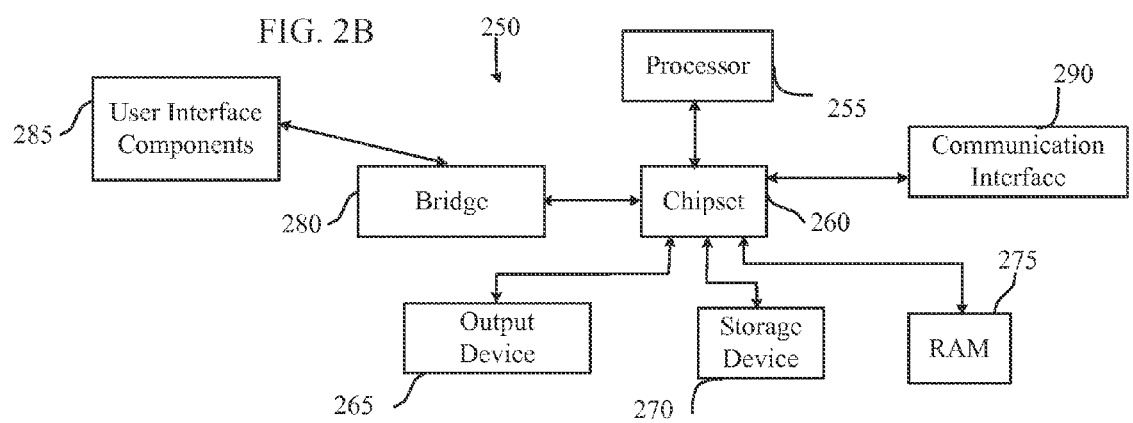
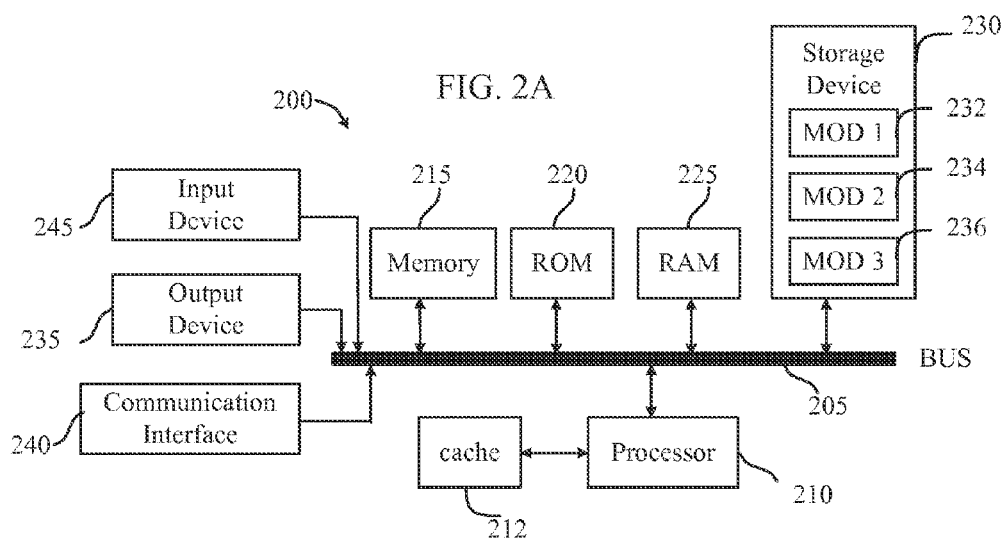

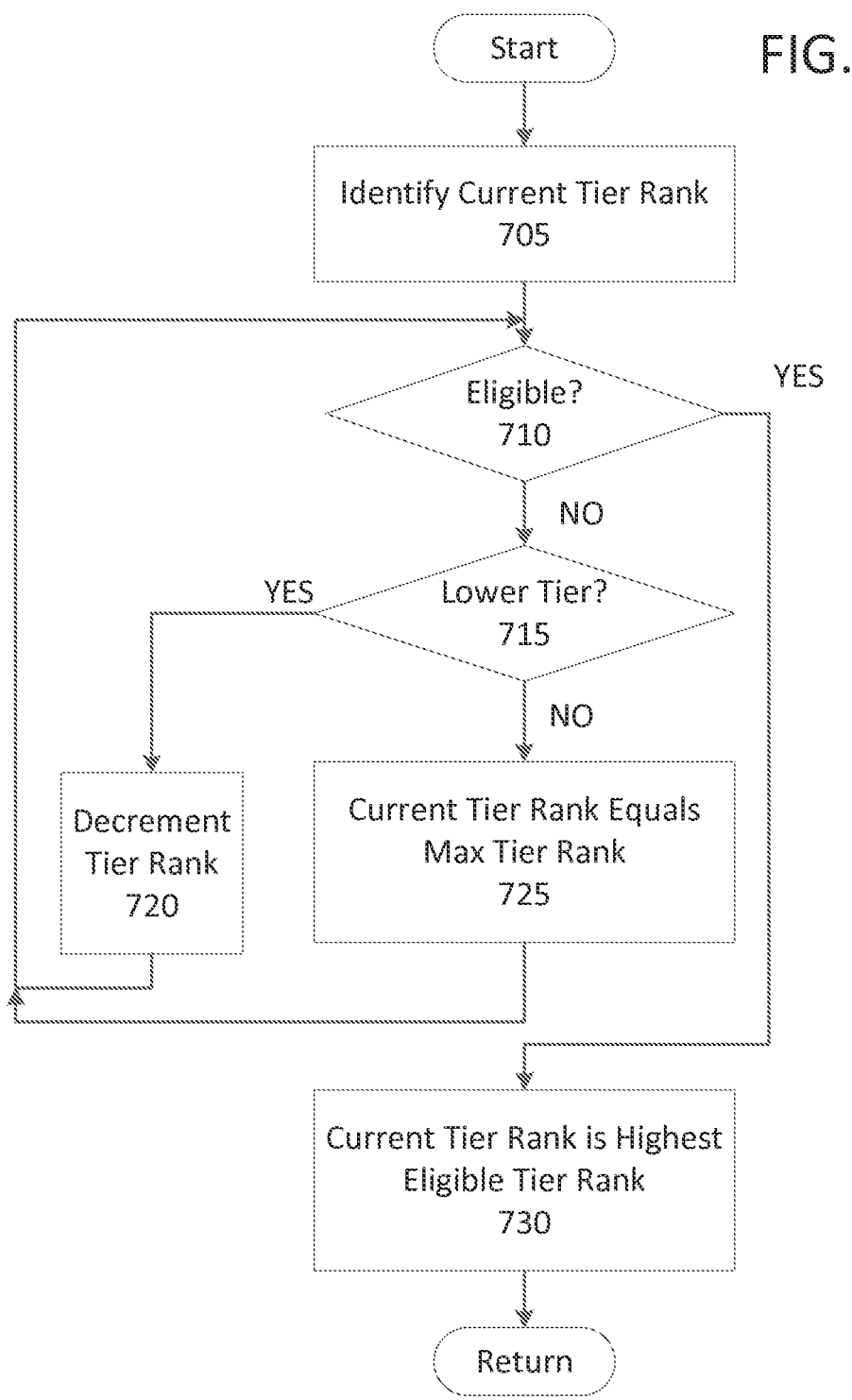

WORK CONSERVING SCHEDULAR BASED ON RANKING

CROSS REFERENCE TO RELATED APPLICATIONS

This application claims priority to U.S. provisional application No. 61/900,377, filed on Nov. 5, 2013, which is expressly incorporated by reference herein in its entirety.

TECHNICAL FIELD

The present technology pertains to work schedulers, and more specifically pertains to a work conserving scheduler based on ranking.

BACKGROUND

The most popular work conserving scheduler design is Deficit Weighted Round Robin (DWRR). In this design, a deficit value is maintained for each queue from which data packets are processed. The deficit value can indicate the remaining amount of credits available to process the data in the queue. As long as the deficit for a queue is greater than zero, the queue is eligible to process requests. Data packets are processed from each eligible queue in a round robin manner, using up credits as work is done, until each queue is ineligible, at which time each queue is credited with additional credit and the deficit for each queue is reset accordingly. To provide differing weights to the queues, the amount of data credited to each queue can vary. Accordingly, a queue with a greater weight can be credited with more data, thereby ensuring that a greater amount of data is processed from the queue before the queues are all refreshed. At any moment a queue is assigned one of only two priorities: eligible to be scheduled, or ineligible to be scheduled.

An alternative to DWRR is to use time stamps instead of a deficit for each queue. A time stamp for each queue can be initially set at zero and then incremented as data is processed from the queue. Data packets can be processed from the queue with the minimum time stamp. There can be many levels of priorities in the system. For example if the time stamp value is between 0 and 255 (and 8 bit value), a queue can be assigned one of 256 priority values corresponding to the time stamp value. This requires a fast search to be performed between each process to identify the queue with the minimum time stamp. To provide differing weights to the queues, each time stamp can be incremented at differing rates. Thus, the time stamp for a queue with a higher weight can be incremented at a slower rate than the time stamp for a queue with a lower weight. Managing the weight by utilizing differing rates allows the queues to be continuously credited rather than waiting for the queue to become ineligible to refresh.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIGS. 2A and 2B illustrate example system embodiments of a computing device;

FIG. 7 illustrates an example method embodiment of determining the highest eligible tier rank.

DESCRIPTION OF EXAMPLE EMBODIMENTS

Figure 1:
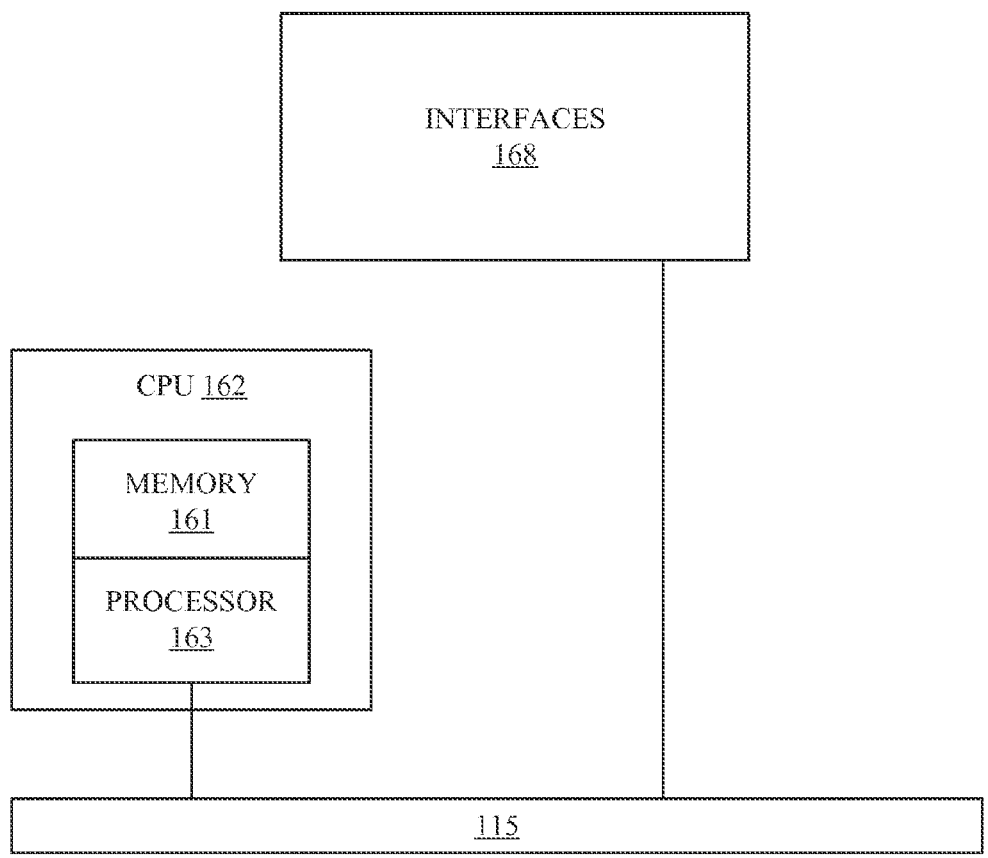
FIG. 1 illustrates an example network device according to some aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

A work conserving scheduler can be implemented based on a ranking system to provide the scalability and superior resolution of time stamps while avoiding the cost of fast search computation associated with a traditional time stamp implementation. Each queue can be assigned a time stamp that is initially set to zero. The time stamp for a queue can be incremented each time a data packet from the queue is processed. To provide varying weights to the different queues, the time stamp for the queues can be incremented at varying rates, thereby causing data packets from the queues that are incremented at the slowest rate to be processed more often. Let R be the desired rate, Q be the amount of work performed, then the time stamp value T can be re-calculated after work as $T=T+Q/R$. In some cases, Q can be proportional to the size of data processed, so that processing 100 kb of data advances the time stamp by twice the amount as processing 50 kb of data. In other cases Q can be replaced by a constant C, so that each time a queue is worked on the time stamp is advanced by a fixed amount, $C/R$. Generally speaking the latter option may be chosen to avoid a division operation because $C/R$ can be computed offline.

The data packets can be processed from the queues based on the tier rank order of the queues as determined from the time stamp associated with each queue. To increase the speed at which the ranking is determined, the ranking can be calculate from a subset of the bits defining the time stamp rather than the entire bit set. For example, the ranking can be calculated from the four most significant bits (MSB) of a time stamp that is greater than 4 bits, resulting in 16 possible tier ranks for the queues. A data packet can be processed from a queue selected from the highest tier rank, i.e., the queues whose time stamp values' four MSBs have the smallest value. The current highest rank tier can be saved and used to increase the speed at which the next queue is selected.

To further speed up the search for the eligible highest rank tier, a bit of information is stored per tier indicating if that tier is eligible, i.e., if it contains at least one member queue. For example in a 16 tier rank system, 16 bits of information is maintained. Finding the highest rank tier that is eligible only requires searching the 16 bit vector.

Description

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which VMs communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Network segments, such as physical or virtual segments; networks; devices; ports; physical or logical links; and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L3 routed network. In addition, a bridge domain interface can support internet protocol (IP) termination, VPN termination, address resolution handling, MAC addressing, etc. Both bridge domains and bridge domain interfaces can be identified by a same index or identifier.

Furthermore, endpoint groups (EPGs) can be used in a network for mapping applications to the network. In particular, EPGs can use a grouping of application endpoints in a network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries.

Cloud computing can also be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), etc. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), databases, applications (Apps), etc.

Cloud computing resources may include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

The disclosed technology addresses the need in the art for a work conserving scheduler based on ranking. Disclosed are systems, methods, and computer-readable storage media for a work conserving schedule based on ranking. A brief introductory description of example systems and networks, as illustrated in FIGS. 1 through 4, is disclosed herein. A detailed description of a work conserving scheduler based on ranking, related concepts, and example variations, will then follow. These variations shall be described herein as the various embodiments are set forth. The disclosure now turns to FIG. 1.

FIG. 1 illustrates an example network device 110 suitable for implementing the present invention. Network device 110 includes a master central processing unit (CPU) 162, interfaces 168, and bus 115 (e.g., a PCI bus). When acting under the control of appropriate software or firmware, CPU 162 is responsible for executing packet management, error detection, and/or routing functions, such as miscabling detection functions, for example. CPU 162 preferably accomplishes all these functions under the control of software including an operating system and any appropriate applications software. CPU 162 may include one or more processors 163 such as a processor from the Motorola family of microprocessors or the MIPS family of microprocessors. In an alternative embodiment, processor 163 is specially designed hardware for controlling the operations of network device 110. In a specific embodiment, memory 161 (such as non-volatile RAM and/or ROM) also forms part of CPU 162. However, there are many different ways in which memory could be coupled to the system.

Interfaces 168 are typically provided as interface cards (sometimes referred to as "line cards"). Generally, they control the sending and receiving of data packets over the network and sometimes support other peripherals used with network device 110. Among the interfaces 168 that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces 168 may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow CPU 162 to efficiently perform routing computations, network diagnostics, security functions, etc.

Although network device 110 shown in FIG. 1 is one specific embodiment of a network device architecture that can be used to implement the present invention, it is by no means the only network device architecture on which the present invention can be implemented. For example, an architecture having a single processor that handles communications as well as routing computations, etc. is often used. Further, other types of interfaces and media could also be used with network device 110.

The present invention can also be implemented on any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of computing device 200 of FIGS. 2A and 2B.

Regardless of the configuration of network device 100, it may employ one or more memories or memory modules (including memory 161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIG. 2A, and FIG. 2B illustrate example possible system embodiments of a computing device. The more appropriate embodiment will be apparent to those of ordinary skill in the art when practicing the present technology. Persons of ordinary skill in the art will also readily appreciate that other system embodiments are possible.

FIG. 2A illustrates an example system embodiment of computing device 200 utilizing a conventional system bus computing system architecture, wherein the components of the system are in electrical communication with each other using bus 205. Example computing device 200 includes processing unit (CPU or processor) 210 and system bus 205 that couples various system components including system memory 215, such as read only memory (ROM) 220 and random access memory (RAM) 225, to processor 210. Computing device 200 can include a cache of high-speed memory connected directly with, in close proximity to, or integrated as part of processor 210. Computing device 200 can copy data from memory 215 and/or storage device 230 to cache 212 for quick access by processor 210. In this way, cache 212 can provide a performance boost that avoids delays to processor 210 while waiting for data. These and other modules can control or be configured to control processor 210 to perform various actions. System memory 215 may be available for use as well. Memory 215 can include multiple different types of memory with different performance characteristics. Processor 210 can include any general purpose processor and a hardware module or software module, such as module 1 232, module 2 234, and module 3 236 stored in storage device 230, configured to control processor 210 as well as a special-purpose processor where software instructions are incorporated into the actual processor design. Processor 210 may essentially be a completely self-contained computing system, containing multiple cores or processors, a bus, memory controller, cache, etc. A multi-core processor may be symmetric or asymmetric.

Computing device 200 can include input device 245 to enable user interaction with computing device 200. Input device 245 can represent any number of input mechanisms, such as a microphone for speech, a touch-sensitive screen for gesture or graphical input, keyboard, mouse, motion input, speech and so forth. Output device 235 can also be one or more of a number of output mechanisms known to those of skill in the art. In some instances, multimodal systems can enable a user to provide multiple types of input to communicate with computing device 200. Communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

Storage device 230 can include software modules 232, 234, 236 for controlling processor 210. Other hardware or software modules are contemplated. Storage device 230 can be connected to system bus 205. In one aspect, a hardware module that performs a particular function can include the software component stored in a computer-readable medium in connection with the necessary hardware components, such as processor 210, bus 205, display 235, and so forth, to carry out the function.

FIG. 2B illustrates a system embodiments of computing device 250 having a chipset architecture that can be used in executing the described method and generating and displaying a graphical user interface (GUI). Computing device 250 is an example of computer hardware, software, and firmware that can be used to implement the disclosed technology. Computing device 250 can include processor 255, representative of any number of physically and/or logically distinct resources capable of executing software, firmware, and hardware configured to perform identified computations. Processor 255 can communicate with chipset 260 that can control input to and output from processor 255. In this example, chipset 260 outputs information to output 265, such as a display, and can read and write information to storage device 270, which can include magnetic media, and solid state media. Chipset 260 can also read data from and write data to RAM 275. Computing device 250 can include bridge 280 for interfacing with a variety of user interface components 285 such as chipset 260. Such user interface components 285 can include a keyboard, a microphone, touch detection and processing circuitry, a pointing device, such as a mouse, and so on. In general, inputs to computing device 250 can come from any of a variety of sources, machine generated and/or human generated.

Chipset 260 can also interface with one or more communication interfaces 290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by computing device 250 itself by processor 255 analyzing data stored in storage 270 or 275. Further, computing device 250 can receive inputs from a user via user interface components 285 and execute appropriate functions, such as browsing functions by interpreting these inputs using processor 255.

It can be appreciated that example computing devices 200 and 250 can have more than one processor 210 or be part of a group or cluster of computing devices networked together to provide greater processing capability.

Figure 3:
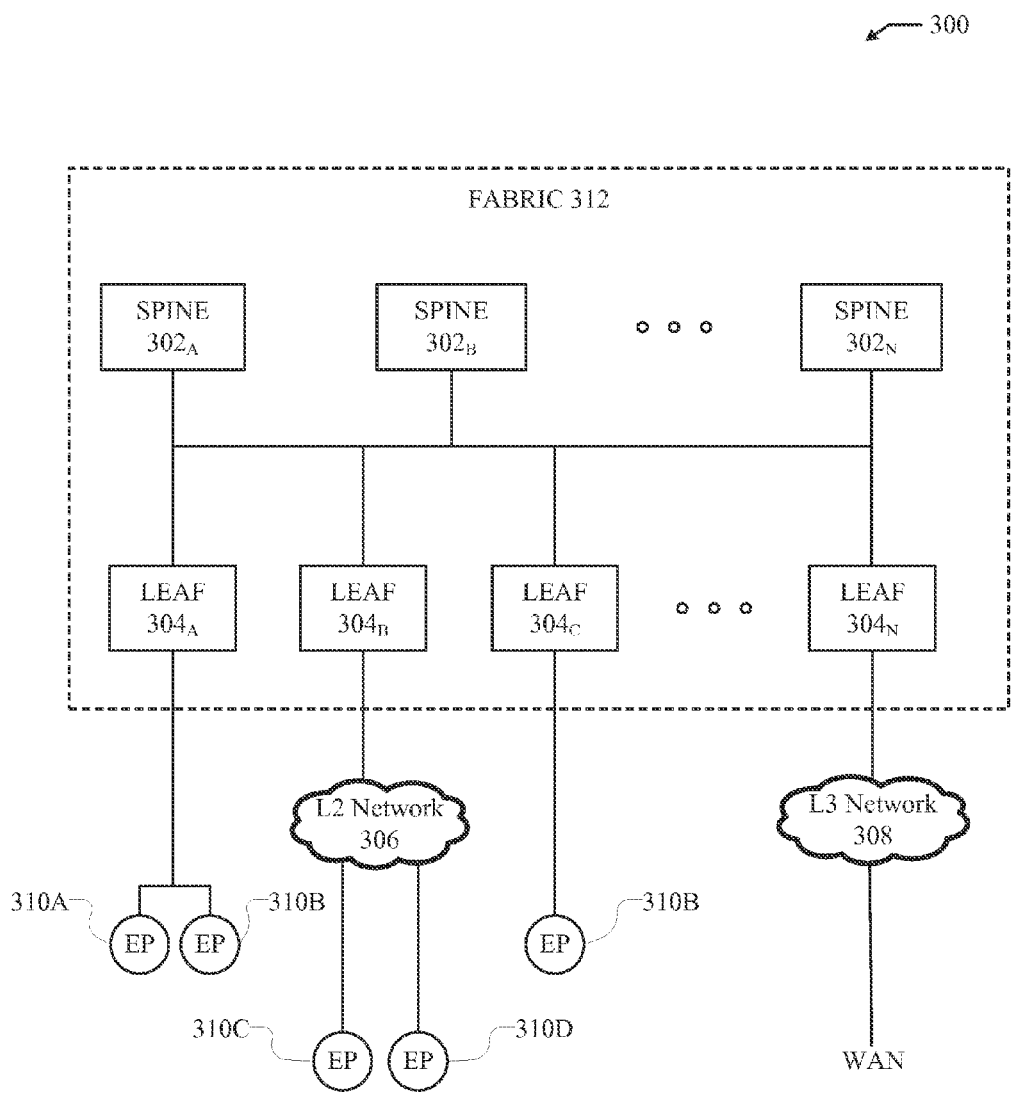
FIG. 3 illustrates a schematic block diagram of an example architecture for a network fabric.

FIG. 3 illustrates a schematic block diagram of example architecture 300 for network fabric 312. Network fabric 312 can include spine switches $302_A$, $302_B$, ..., $302_N$ (collectively "302") connected to leaf switches $304_A$, $304_B$, $304_C$, ..., $304_N$ (collectively "304") in network fabric 312.

Spine switches 302 can be L3 switches in fabric 312. However, in some cases, spine switches 302 can also, or otherwise, perform L2 functionalities. Further, spine switches 302 can support various capabilities, such as 40 or 10 Gbps Ethernet speeds. To this end, spine switches 302 can include one or more 40 Gigabit Ethernet ports. Each port can also be split to support other speeds. For example, a 40 Gigabit Ethernet port can be split into four 10 Gigabit Ethernet ports.

In some embodiments, one or more of spine switches 302 can be configured to host a proxy function that performs a lookup of the endpoint address identifier to locator mapping in a mapping database on behalf of leaf switches 304 that do not have such mapping. The proxy function can do this by parsing through the packet to the encapsulated, tenant packet to get to the destination locator address of the tenant. Spine switches 302 can then perform a lookup of their local mapping database to determine the correct locator address of the packet and forward the packet to the locator address without changing certain fields in the header of the packet.

When a packet is received at spine switch $302_i$, spine switch $302_i$ can first check if the destination locator address is a proxy address. If so, spine switch $302_i$ can perform the proxy function as previously mentioned. If not, spine switch $302_i$ can lookup the locator in its forwarding table and forward the packet accordingly.

Spine switches 302 connect to leaf switches 304 in fabric 312. Leaf switches 304 can include access ports (or non-fabric ports) and fabric ports. Fabric ports can provide uplinks to spine switches 302, while access ports can provide connectivity for devices, hosts, endpoints, VMs, or external networks to fabric 312.

Leaf switches 304 can reside at the edge of fabric 312, and can thus represent the physical network edge. In some cases, leaf switches 304 can be top-of-rack ("ToR") switches configured according to a ToR architecture. In other cases, leaf switches 304 can be aggregation switches in any particular topology, such as end-of-row (EoR) or middle-of-row (MoR) topologies. Leaf switches 304 can also represent aggregation switches, for example.

Leaf switches 304 can be responsible for routing and/or bridging the tenant packets and applying network policies. In some cases, a leaf switch can perform one or more additional functions, such as implementing a mapping cache, sending packets to the proxy function when there is a miss in the cache, encapsulate packets, enforce ingress or egress policies, etc.

Moreover, leaf switches 304 can contain virtual switching functionalities, such as a virtual tunnel endpoint (VTEP) function as explained below in the discussion of VTEP 408 in FIG. 4. To this end, leaf switches 304 can connect fabric 312 to an overlay network, such as overlay network 400 illustrated in FIG. 4.

Network connectivity in fabric 312 can flow through leaf switches 304. Here, leaf switches 304 can provide servers, resources, endpoints, external networks, or VMs access to fabric 312, and can connect leaf switches 304 to each other. In some cases, leaf switches 304 can connect EPGs to fabric 312 and/or any external networks. For example, each EPG can connect to fabric 312 via one of leaf switches 304.

Endpoints 310A-E (collectively "310") can connect to fabric 312 via leaf switches 304. For example, endpoints 310A and 310B can connect directly to leaf switch 304A, which can connect endpoints 310A and 310B to fabric 312 and/or any other one of leaf switches 304. Similarly, endpoint 310E can connect directly to leaf switch 304C, which can connect endpoint 310E to fabric 312 and/or any other of leaf switches 304. On the other hand, endpoints 310C and 310D can connect to leaf switch 304B via L2 network 306. Similarly, the wide area network (WAN) can connect to leaf switches 304C or 304D via L3 network 308.

Endpoints 310 can include any communication device, such as a computing device, network device, server, switch, router, etc. In some cases, endpoints 310 can include a server, hypervisor, or switch configured with a VTEP functionality which connects an overlay network, such as overlay network 400 below, with fabric 312. For example, in some cases, endpoints 310 can represent one or more of the VTEPs 408A-D illustrated in FIG. 4. Here, the VTEPs 408A-D can connect to fabric 312 via leaf switches 304. The overlay network can host physical devices, such as servers, applications, EPGs, virtual segments, virtual workloads, etc. In addition, endpoints 310 can host virtual workload(s), clusters, and applications or services, which can connect with fabric 312 or any other device or network, including an external network. For example, one or more of endpoints 310 can host, or connect to, a cluster of load balancers or an EPG of various applications.

Although fabric 312 is illustrated and described herein as an example leaf-spine architecture, one of ordinary skill in the art will readily recognize that the subject technology can be implemented based on any network fabric, including any data center or cloud network fabric. Indeed, other architectures, designs, infrastructures, and variations are contemplated herein.

Figure 4:
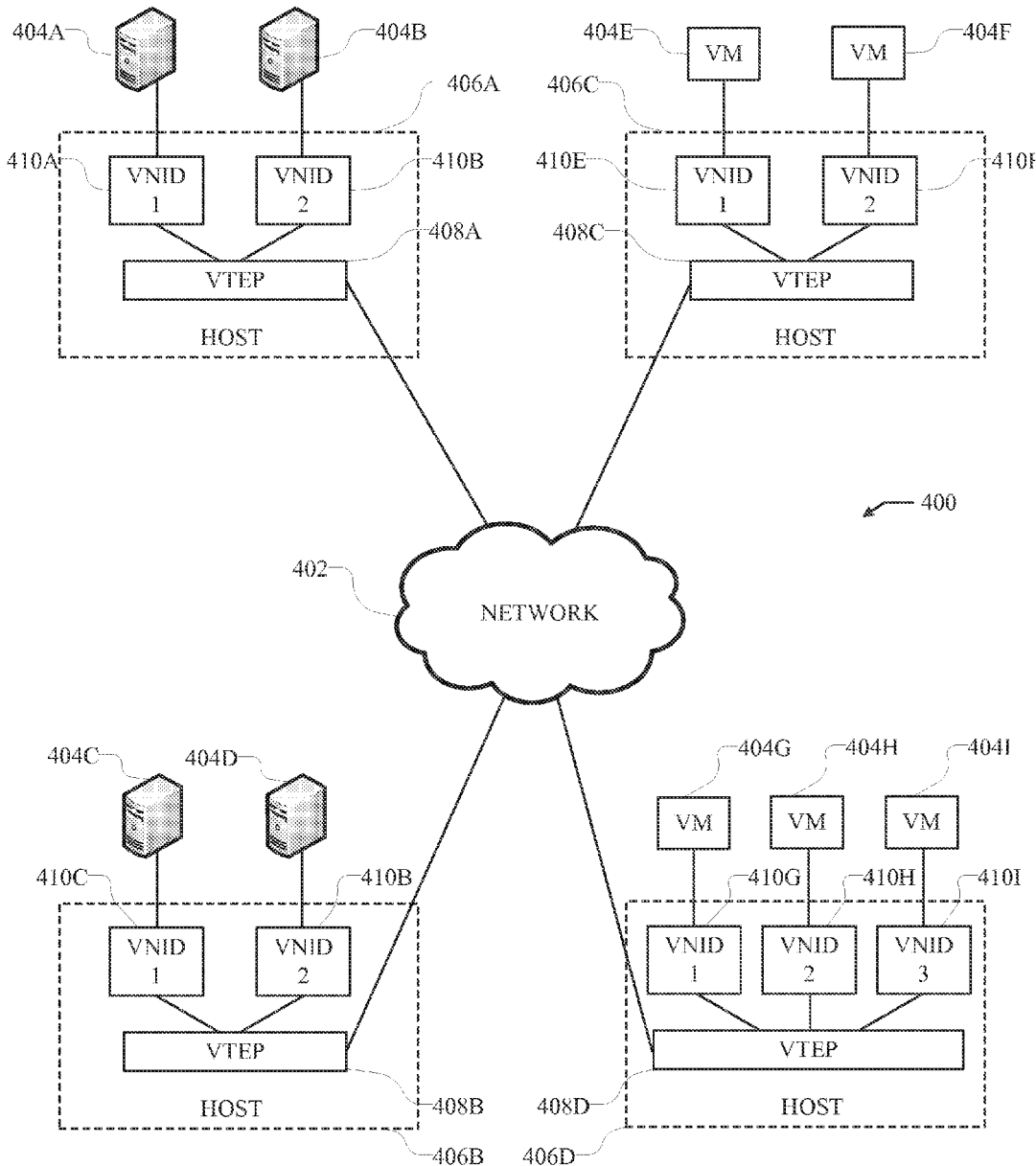
FIG. 4 illustrates an example overlay network.

FIG. 4 illustrates an example overlay network 400. Overlay network 400 uses an overlay protocol, such as VXLAN, VGRE, VO3, or STT, to encapsulate traffic in L2 and/or L3 packets which can cross overlay L3 boundaries in the network. As illustrated in FIG. 4, overlay network 400 can include hosts 406A-D interconnected via network 402.

Network 402 can include a packet network, such as an IP network. Moreover, network 402 can connect overlay network 400 with fabric 312 in FIG. 3. For example, VTEPs 408A-D can connect with leaf switches 304 in fabric 312 via network 402.

Hosts 406A-D include virtual tunnel end points (VTEP) 408A-D, which can be virtual nodes or switches configured to encapsulate and de-encapsulate data traffic according to a specific overlay protocol of the network 400, for the various virtual network identifiers (VNIDs) 410A-I. Moreover, hosts 406A-D can include servers containing a VTEP functionality, hypervisors, and physical switches, such as L3 switches, configured with a VTEP functionality. For example, hosts 406A and 406B can be physical switches configured to run VTEPs 408A-B. Here, hosts 406A and 406B can be connected to servers 404A-D, which, in some cases, can include virtual workloads through VMs loaded on the servers, for example.

In some embodiments, network 400 can be a VXLAN network, and VTEPs 408A-D can be VXLAN tunnel end points. However, as one of ordinary skill in the art will readily recognize, network 400 can represent any type of overlay or software-defined network, such as NVGRE, STT, or even overlay technologies yet to be invented.

The VNIDs can represent the segregated virtual networks in overlay network 400. Each of the overlay tunnels (VTEPs 408A-D) can include one or more VNIDs. For example, VTEP 408A can include VNIDs 1 and 2, VTEP 408B can include VNIDs 1 and 3, VTEP 408C can include VNIDs 1 and 2, and VTEP 408D can include VNIDs 1-3. As one of ordinary skill in the art will readily recognize, any particular VTEP can, in other embodiments, have numerous VNIDs, including more than the 3 VNIDs illustrated in FIG. 4.

The traffic in overlay network 400 can be segregated logically according to specific VNIDs. This way, traffic intended for VNID 1 can be accessed by devices residing in VNID 1, while other devices residing in other VNIDs (e.g., VNIDs 2 and 3) can be prevented from accessing such traffic. In other words, devices or endpoints connected to specific VNIDs can communicate with other devices or endpoints connected to the same specific VNIDs, while traffic from separate VNIDs can be isolated to prevent devices or endpoints in other specific VNIDs from accessing traffic in different VNIDs.

Servers 404A-D and VMs 404E-I can connect to their respective VNID or virtual segment, and communicate with other servers or VMs residing in the same VNID or virtual segment. For example, server 404A can communicate with server 404C and VMs 404E and 404G because they all reside in the same VNID, viz., VNID 1. Similarly, server 404B can communicate with VMs 404F, H because they all reside in VNID 2. VMs 404E-I can host virtual workloads, which can include application workloads, resources, and services, for example. However, in some cases, servers 404A-D can similarly host virtual workloads through VMs hosted on the servers 404A-D. Moreover, each of the servers 404A-D and VMs 404E-I can represent a single server or VM, but can also represent multiple servers or VMs, such as a cluster of servers or VMs.

VTEPs 408A-D can encapsulate packets directed at the various VNIDs 1-3 in the overlay network 400 according to the specific overlay protocol implemented, such as VXLAN, so traffic can be properly transmitted to the correct VNID and recipient(s). Moreover, when a switch, router, or other network device receives a packet to be transmitted to a recipient in the overlay network 400, it can analyze a routing table, such as a lookup table, to determine where such packet needs to be transmitted so the traffic reaches the appropriate recipient. For example, if VTEP 408A receives a packet from endpoint 404B that is intended for endpoint 404H, VTEP 408A can analyze a routing table that maps the intended endpoint, endpoint 404H, to a specific switch that is configured to handle communications intended for endpoint 404H. VTEP 408A might not initially know, when it receives the packet from endpoint 404B, that such packet should be transmitted to VTEP 408D in order to reach endpoint 404H. Accordingly, by analyzing the routing table, VTEP 408A can lookup endpoint 404H, which is the intended recipient, and determine that the packet should be transmitted to VTEP 408D, as specified in the routing table based on endpoint-to-switch mappings or bindings, so the packet can be transmitted to, and received by, endpoint 404H as expected.

However, continuing with the previous example, in many instances, VTEP 408A may analyze the routing table and fail to find any bindings or mappings associated with the intended recipient, e.g., endpoint 404H. Here, the routing table may not yet have learned routing information regarding endpoint 404H. In this scenario, the VTEP 408A may likely broadcast or multicast the packet to ensure the proper switch associated with endpoint 404H can receive the packet and further route it to endpoint 404H.

In some cases, the routing table can be dynamically and continuously modified by removing unnecessary or stale entries and adding new or necessary entries, in order to maintain the routing table up-to-date, accurate, and efficient, while reducing or limiting the size of the table. As one of ordinary skill in the art will readily recognize, the examples and technologies provided above are simply for clarity and explanation purposes, and can include many additional concepts and variations.

Figure 5:
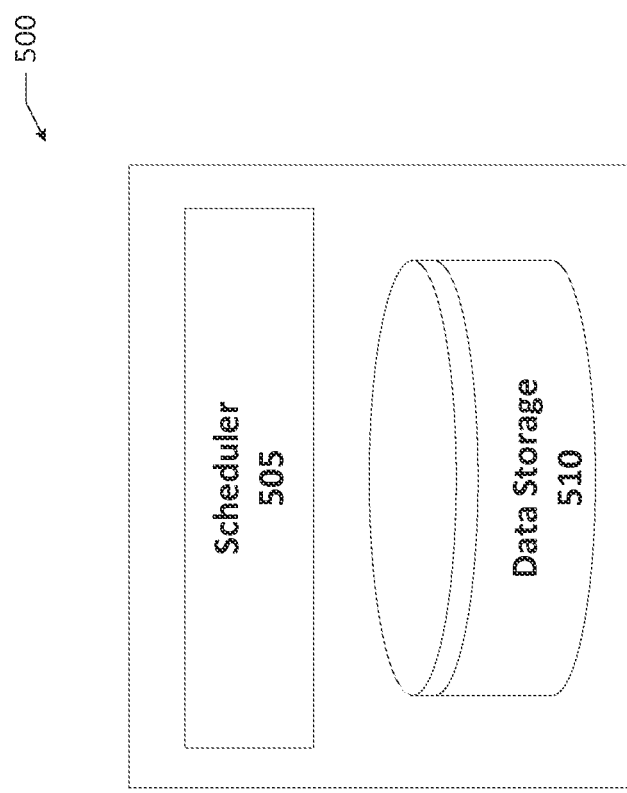
FIG. 5 illustrates an example system embodiment according to some aspects of the subject technology.

FIG. 5 illustrates an example system embodiment in which a work conserving scheduler can be implemented based on a ranking system to provide the scalability and resolution of time stamps while avoiding the fast search associated with a traditional time stamp implementation. As shown device 500 includes scheduler 505, which can be configured to manage data transfer from one or more source devices to one or more recipient devices. Device 500 can be any type of computing and/or networking device, such as those described in FIGS. 1, 2A and 2B. Scheduler 505 can be used to manage data packet transmissions across a network between various network devices and/or computing devices, such as those described in FIGS. 1, 2A and 2B. For example, in some embodiments, device 500 can be the source device transmitting data to one or more recipient devices in network connection with device 505. Alternatively, in some embodiments, device 505 can be in network connection with one or more source devices and recipient devices and serve as an intermediary between the various devices to transmit data between them.

Scheduler 505 can assign data that is scheduled to be transferred to one or more queues. Scheduler 505 can process the data assigned to a queue in a first in first out order corresponding to the order in which the data was assigned to the queue. As shown, device 500 can include data storage 510 configured to maintain data and queues, and scheduler 505 can be configured to communicate with data storage 510 to access the queues to retrieve and store data.

Scheduler 505 can utilize multiple queues to manage transmission of data from multiple destinations and/or to multiple sources. For example, data being transmitted to a specified destination and/or from a specified source can be assigned to a queue associated with the specified source and/or destination, while data being transmitted to a different destination and/or from a different source can be assigned to a different queue.

Scheduler 505 can be configured to manage the order in which the queues are processed to meet specified transmission goals and/or preferences. For example, the various queues can be assigned varying weights to give varying priority levels to the data assigned to the various queues. A queue can be given a higher weight to ensure that data assigned to the queue is processed at a higher rate than data assigned to a queue with a lower weight.

Scheduler 505 can process data packets from the queues based on a tier rank order of the queues that is calculated based on a time stamp assigned to each queue. Scheduler 505 can assign each queue a time stamp that is initially set to a base value, such as zero. The time stamp for each queue can be stored in data storage 510 and associated with its corresponding queue. Scheduler 505 can be configured to increment the time stamp associated with a queue each time a data packet from the queue is processed. Processing a data packet can include removing the data packet from the queue, and transmitting the data packet to its intended recipient device.

In some embodiments, scheduler 505 can be configured to increment the time stamp by an amount that is based on or corresponds to the size of the data packet that was processed. For example, if the data packet that was processed was 500 kb, scheduler 505 can increment the time stamp by 500 or some other value that was calculated based on the size of the data packet. Let Q be the amount of data processed, then the time stamp value T can be updated as T=T+Q.

Alternatively, in some embodiments, scheduler 505 can be configured to increment the time stamp by a set predetermined amount that is not based on the size of the data packet that was processed. For example, scheduler 505 can be configured to increment the time stamp associated with a queue by 100 each time a data packet is processed from the queue. Let C be the predetermined value, the time stamp value T can be updated as T=T+C.

In some embodiments, scheduler 505 can be configured to wrap around the time stamp value for a queue when the time stamp value reaches a maximum value. The maximum value can be based on the number of bits used to represent the time stamp value. For example, if 8 bits are used, the maximum value for time stamp value can be 256, after which the time stamp value wraps back around to 0.

To provide varying weights to the different queues, scheduler 505 can be configured to increment the time stamp for the queues at varying rates. For example, an administrator can set a weighted rate at which the time stamp for each queue is to be incremented and scheduler 505 can be configured to increment the time stamps for the various queues accordingly. In some embodiments, the weighted rate can be a static predetermined amount. The static predetermined amount can be the total amount by which a time stamp is incremented or, alternatively, an additional amount the time stamp is incremented. For example, the weighted rate for a queue can be a static amount such as 100 and scheduler 505 can increment the time stamp of the queue by 100 each time a data packet from the queue is processed. Alternatively, scheduler 505 can increment the time stamp by an amount calculated based on the size of the data packet processed plus the fixed weighted rate amount of 100.

Alternatively, in some embodiments, the weighted rate can be a multiplier that is applied to the amount that the time stamp is incremented. For example, scheduler 505 can be configured to increment a time stamp for a queue based on the size of the data packet processed from the queue multiplied by the weighted rate assigned to the queue. Thus to reduce the rate at which a time stamp for a queue is incremented, the weighted rate for the queue can be set to a fractional amount between 0 and 1. Alternatively, to increase the rate at which a time stamp for a queue is incremented, the weighted rate for the queue can be set to an amount greater than 1. Let R be the rate and Q be the amount of data processed, time stamp value can be updated as T=T+Q/R. Or, represent the rate as the reciprocal of R, r=1/R, then T=T+Q*r.

Scheduler 505 can be configured to process data packets from the queues according to the tier rank order of the queues as determined from the time stamp associated with each queue. The tier rank order of a queue can indicate the value of the time stamp assigned to the queue. For example, scheduler 505 can be configured to assign the queues to a tier rank such that the queues assigned to each tier rank have a lower time stamp value than queues assigned to a lower ranked tier rank, and a higher tamp stamp value than queues assigned to a higher ranked tier rank. One easy way is to map a queue to a tier based on the MSBs of its time stamp. For example in a 16 tier system, we can use the 4 MSBs of the time stamp to identify the tier rank of the queue.

Scheduler 505 can be configured to process data packets from a queue from the highest eligible tier rank. A tier rank can be eligible if at least one queue is assigned to the tier rank. Processing a queue from the highest eligible tier rank can give priority to the queues with the lowest time stamp value. Scheduler 505 can be configured to recalculate the tier rank for a queue each time a data packet is processed from the queue.

To speed up the search for the highest ranked eligible tier, a bit of information can be maintained for each tier indicating its eligibility. The bit is updated whenever a queue enters of leaves the corresponding tier. In order to find the highest eligible tier, only these bits are evaluated. In a 16 tier system only 16 bits need to be evaluated, independent of the number of queues supported. In contrast, the fast search computation load of a traditional time stamp operation increases in proportion to the number of queues.

If multiple queues are assigned to a highest eligible tier rank, scheduler 505 can be configured to process a data packet from one of the queues in the tier rank in any order that minimizes cost. For example, scheduler 505 can select from the queues in the highest eligible tier rank at random, according to a round robin order, etc.

To increase the speed at which the tier rank of a queue is determined, scheduler module 505 can be configured to calculate the tier rank based on a subset of the bits defining the time stamp rather than the entire bit set. For example, the tier ranking can be calculated from the four most significant bits (MSB), resulting in 16 possible tier ranks for the queues. Alternatively, the ranking can be calculated from the three MSB, resulting in 8 possible tier ranks Whenever more than 1 bit is used, the ranking method provides more granular priorities than DWRR, which effectively has only two tiers: eligible and ineligible. This finer granularity results in quality of service that has better short term accuracy to the desired rate.

In some embodiments, scheduler 505 can be configured to record the highest eligible tier rank when a data packet is processed, which can then be used as a starting position when identifying the next queue from which to process a data packet. For example, scheduler 505 can be configured to begin the search for the next queue from which to process a data packet from the recorded highest tier rank and, if there are no other queues in the tier rank, continuing the search in the next lower tier rank. If there are no queues in the lowest tier rank, scheduler 505 can continue the search at the highest tier rank.

Scheduler 505 can be configured to automatically credit the queues with additional data prior to the queue being exhausted, when other queues' time stamps increase in value and move to a relatively lower tier. This can result in each queue remaining eligible, however being assigned to a tier rank that prioritizes the queue.

Figure 6:
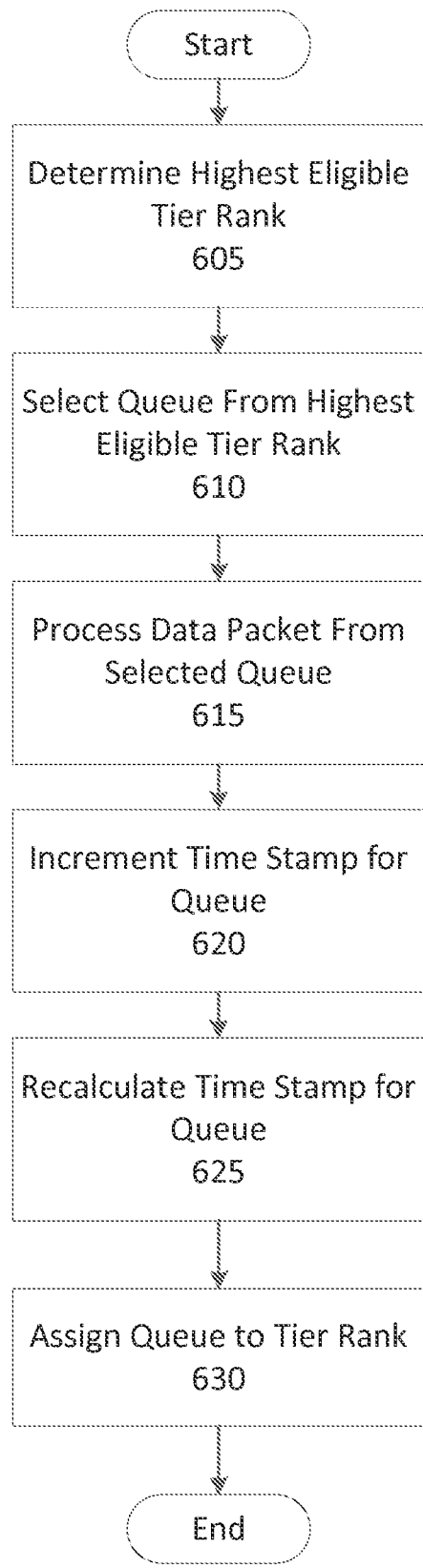
FIG. 6 illustrates an example embodiment of processing data packets using a work conserving scheduler based on ranking.

FIG. 6 illustrates an example embodiment of processing data packets using a work conserving scheduler based on ranking. As shown, the method begins at block 605 where the highest eligible tier rank is determined. The highest eligible tier rank can be the highest tier rank that includes at least one queue. Determining the highest eligible tier rank is described in greater detail in FIG. 7 and the accompanying text.

At block 610, a queue is selected from the highest eligible tier rank. If there is only one queue assigned to the highest eligible tier rank, then that queue is selected. Alternatively, if there are multiple queues assigned to the highest eligible tier rank, one of the queues can be selected by random or, alternatively, selected according to a round robin order.

At block 615, a data packet is processed from the selected queue. This can include removing the data packet from the queue and transmitting the data packet to its intended recipient.

At block 620, the time stamp for the selected queue is incremented. In some embodiments, the time stamp can be incremented according to the size of the data packet, Q, that was transferred. In some embodiments, the time stamp can be incremented by a static value, C, that is not based on the size of the data packet that was transferred. Further, in some embodiments, a weighted rate, R, can be applied when incrementing the time stamp. For example, the weighted rate can be an additional valued added to the time stamp or, alternatively, a multiplier applied to the value so that Q/R is added to the time stamp.

At block 625, the tier rank of the selected queue can be re-calculated based on the incremented time stamp. For example, the tier rank can be calculated based on a subset of the most significant bits used to represent the time stamp, such as the 4 most significant bits. Using the 4 most significant bits can result in 16 possible tier ranks. At block 630, the selected queue can be assigned to the corresponding tier rank. Queues can be assigned to tier ranks such that queues with the highest time stamp value are in the lowest tier rank and vice versa. The re-calculated time stamp may put the queue in a different tier rank.

As a result of the queue moving to a different rank tier, the highest ranked tier so far may become ineligible (containing no valid queue). For example if the serviced queue was the only member of the highest ranked tier.

FIG. 7 illustrates an example method embodiment of determining the highest eligible tier rank. A tier rank can be eligible if at least one queue is assigned to the tier rank. As shown, the method begins at block 705 where the current tier rank is identified. The current tier rank can be the tier rank from which the previous queue was selected to process a data packet. The current tier rank can be recorded as an integer value that identifies a tier rank. For example, in an embodiments utilizing 16 possible tier rank, the current tier rank can be an integer between 0-15.

At block 710 it is determined if the current tier rank is eligible. A tier rank can be eligible if at least one queue is assigned to the tier rank. If at block 710 it is determined that the current tier rank is not eligible, the method continues to block 715 where it is determined if there is a tier rank that is ranked lower than the current tier rank. If there is a tier rank ranked lower than the current tier rank, the method continues to block 720 where the current tier rank is decremented to the next tier rank. For example, if the current tier rank is and it is not eligible, the current tier rank can be decremented to 4. The method then returns to block 710.

If at block 715 it is determined that there is no tier rank ranked lower than the current tier rank, i.e. the current tier rank is the lowest ranked tier rank, the method continues to block 725 where the current tier rank is assigned to the highest ranked tier rank. For example, if there are 16 tier ranks 0-15, with 0 being the lowest and 15 being the highest, the current tier rank can be assigned to 15. The method then returns to block 710.

If at block 710, it is determined that the current tier rank is eligible, the method continues to 730 where it is determined that the current tier rank is the highest eligible tier rank.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
   calculating, by a computer processor, a tier rank for a first queue from a subset of most significant bits defining a time stamp value associated with the first queue, wherein the first queue contains a plurality of data packets;
   calculating, by the computer processor, a tier rank for a second queue, different than the first queue, from a subset of most significant bits defining a time stamp value associated with the second queue, wherein the second queue contains a plurality of data packets;
   storing a respective information bit to indicate eligibility for each tier rank;
   updating the respective information bit when a queue enters or leaves each tier rank;
   determining, by the computer processor, that the tier rank for the first queue is higher than the tier rank for the second queue; and
   processing, by the computer processor, at least one of the plurality of data packets contained in the first queue.

2. The method of claim 1, further comprising:
   incrementing the time stamp value associated with the first queue by a first increment value; and
   after incrementing the time stamp value associated with the first queue, recalculating the tier rank for the first queue from the subset of most significant bits defining the time stamp value associated with the first queue.

3. The method of claim 2, further comprising:
   after recalculating the tier rank for the first queue, determining that the tier rank for the second queue is higher than the tier rank for the first queue; and
   processing at least one of the plurality of data packets contained in the second queue.

4. The method of claim 3, further comprising:
   incrementing the time stamp value associated with the second queue by a second increment value different than the first increment value; and
   after incrementing the time stamp value associated with the second queue, recalculating the tier rank for the second queue from the subset of most significant bits defining the time stamp value associated with the second queue.

5. The method of claim 2, wherein the first increment value is calculated based on:
   a size of the at least one of the plurality of data packets contained in the first queue that was processed, and
   a weight rate assigned to the first queue, wherein the weight rate assigned to the first queue is different than a weight rate assigned to the second queue.

6. The method of claim 1, further comprising:
   recording the tier rank of the first queue as a current tier rank, wherein there is at least one tier rank higher than the tier rank of the first queue; and
   after processing at least one of the plurality of data packets contained in the first queue and prior to determining whether there is a queue assigned to the at least one tier rank higher than the current tier rank is eligible, determining that there are no other queues assigned to the current tier.

7. The method of claim 2, further comprising:
   determining that the tier rank for the first queue is equal to the tier rank for the second queue;
   determining, according to a round robin order, to process at least one of the plurality of data packets contained in the second queue rather than in the first queue; and
   processing at least one of the plurality of data packets contained in the second queue.

8. A system comprising:
   a computer processor; and
   a memory storing instructions that, when executed, cause the computer processor to:
   calculate a tier rank for a first queue from a subset of most significant bits defining a time stamp value associated with the first queue, wherein the first queue contains a plurality of data packets;
   calculate a tier rank for a second queue, different than the first queue, from a subset of most significant bits defining a time stamp value associated with the second queue, wherein the second queue contains a plurality of data packets;
   store a respective information bit to indicate eligibility for each tier rank;
   update the respective information bit when a queue enters or leaves each tier rank;
   determine that the tier rank for the first queue is higher than the tier rank for the second queue; and
   process at least one of the plurality of data packets contained in the first queue.

9. The system of claim 8, wherein the instructions further cause the computer processor to:
   increment the time stamp value associated with the first queue by a first increment value; and
   after incrementing the time stamp value associated with the first queue, recalculate the tier rank for the first queue from the subset of most significant bits defining the time stamp value associated with the first queue.

10. The system of claim 9, wherein the instructions further cause the computer processor to:
    after recalculating the tier rank for the first queue, determine that the tier rank for the second queue is higher than the tier rank for the first queue; and
    process at least one of the plurality of data packets contained in the second queue.

11. The system of claim 10, wherein the instructions further cause the computer processor to:
    increment the time stamp value associated with the second queue by a second increment value different than the first increment value; and
    after incrementing the time stamp value associated with the second queue, recalculate the tier rank for the second queue from the subset of most significant bits defining the time stamp value associated with the second queue.

12. The system of claim 9, wherein the first increment value is calculated based on:
    a size of the at least one of the plurality of data packets contained in the first queue that was processed, and a weight rate assigned to the first queue, wherein the weight rate assigned to the first queue is different than a weight rate assigned to the second queue.

13. The system of claim 8, wherein the instructions further cause the computer processor to:
record the tier rank of the first queue as a current tier rank, wherein there is at least one tier rank higher than the tier rank of the first queue; and
after processing at least one of the plurality of data packets contained in the first queue and prior to determining whether there is a queue assigned to the at least one tier rank higher than the current tier rank is eligible, determine that there are no other queues assigned to the current tier.

14. The system of claim 9, wherein the instructions further cause the computer processor to:
determine that the tier rank for the first queue is equal to the tier rank for the second queue;
determine, according to a round robin order, to process at least one of the plurality of data packets contained in the second queue rather than in the first queue; and
process at least one of the plurality of data packets contained in the second queue.

15. A non-transitory computer-readable medium storing instructions that, when executed by a computer processor, cause the computer processor to:
calculate a tier rank for a first queue from a subset of most significant bits defining a time stamp value associated with the first queue, wherein the first queue contains a plurality of data packets;
calculate a tier rank for a second queue, different from the first queue, from a subset of most significant bits defining a time stamp value associated with the second queue, wherein the second queue contains a plurality of data packets;
store a respective information bit to indicate eligibility for each tier rank;
update the respective information bit when a queue enters or leaves each tier rank;
determine that the tier rank for the first queue is higher than the tier rank for the second queue; and
process at least one of the plurality of data packets contained in the first queue.

16. The non-transitory computer-readable medium of claim 15, wherein the instructions further cause the computer processor to:
increment the time stamp value associated with the first queue by a first increment value; and
after incrementing the time stamp value associated with the first queue, recalculate the tier rank for the first queue from the subset of most significant bits defining the time stamp value associated with the first queue.

17. The non-transitory computer-readable medium of claim 16, wherein the instructions further cause the computer processor to:
after recalculating the tier rank for the first queue, determine that the tier rank for the second queue is higher than the tier rank for the first queue; and
process at least one of the plurality of data packets contained in the second queue.

18. The non-transitory computer-readable medium of claim 17, wherein the instructions further cause the computer processor to:
increment the time stamp value associated with the second queue by a second increment value, different than the first increment value; and
after incrementing the time stamp value associated with the second queue, recalculate the tier rank for the second queue from the subset of most significant bits defining the time stamp value associated with the second queue.

19. The non-transitory computer-readable medium of claim 16, wherein the first increment value is calculated based on:
a size of the at least one of the plurality of data packets contained in the first queue that was processed, and
a weight rate assigned to the first queue, wherein the weight rate assigned to the first queue is different than a weight rate assigned to the second queue.

20. The non-transitory computer-readable medium of claim 15, wherein the instructions further cause the computer processor to:
record the tier rank of the first queue as a current tier rank, wherein there is at least one tier rank higher than the tier rank of the first queue; and
after processing at least one of the plurality of data packets contained in the first queue and prior to determining whether there is a queue assigned to the at least one tier rank higher that the current tier rank is eligible, determine that there are no other queues assigned to the current tier.

* * * * *